H. F. LEICHTFUSS.
POULTRY FEEDER.
APPLICATION FILED AUG. 19, 1912.
1,067,824.
Patented July 22, 1913.
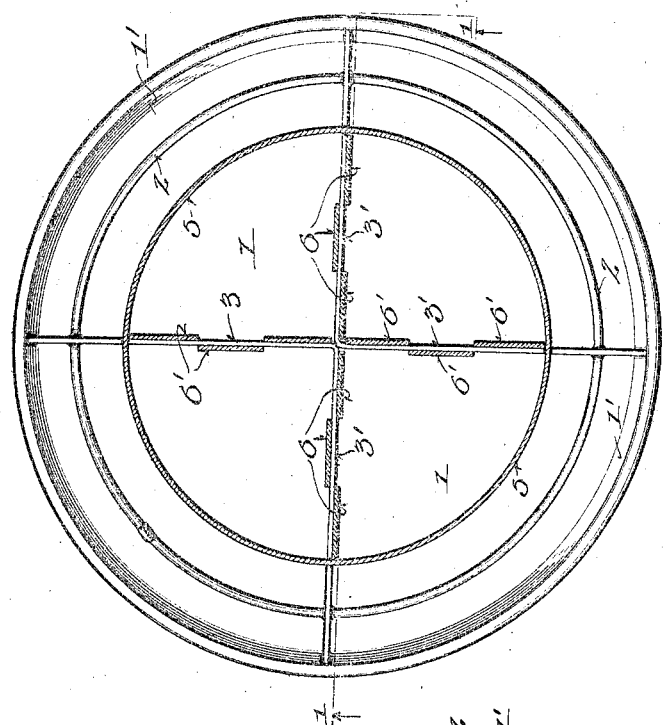
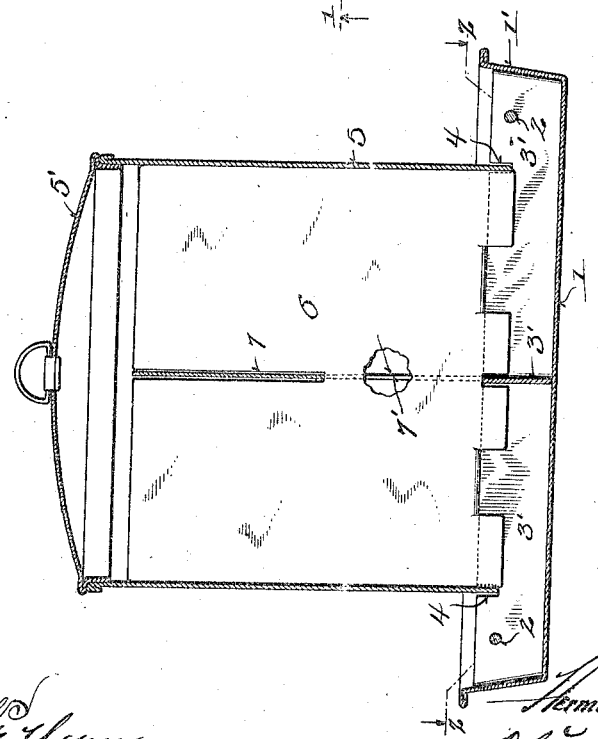

UNITED STATES PATENT OFFICE.

HERMAN F. LEICHTFUSS, OF MILWAUKEE, WISCONSIN.

POULTRY-FEEDER.

1,067,824. Specification of Letters Patent. Patented July 22, 1913.

Application filed August 19, 1912. Serial No. 715,737.

*To all whom it may concern:*

Be it known that I, HERMAN F. LEICHTFUSS, a citizen of the United States, and resident of Milwaukee, in the county of Milwaukee and State of Wisconsin, have invented certain new and useful Improvements in Poultry-Feeders; and I do hereby declare that the following is a full, clear, and exact description thereof.

The object of my invention is to provide a simple and economical poultry feeder so arranged as to prevent the poultry from scattering the feed by "sidesweeping" or "billing", the feeder being capable of operating either in suspension or at rest upon a fixed base.

Specific objects of my invention are to provide a fender in connection with the feed hopper whereby the grain or dry mash is prevented from being thrown out by "sidesweeping" or "billing" of the poultry; to provide division walls in connection with the feed trough to prevent end scattering of the feed, and to provide detachable partition extensions in connection with the magazine or hopper, whereby feed of different qualities can be distributed simultaneously from the same device.

With the above and other objects in view the invention consists in what is herein shown, described and claimed.

In the drawings Figure 1 represents a longitudinal sectional view of a poultry feeder of the magazine type embodying the features of my invention, the section being indicated by line 1—1 of Fig. 2, and Fig. 2, a plan sectional view of the same, the section being indicated by line 2—2 of Fig. 1.

Referring by characters to the drawings, 1 represents a circular pan provided with an upturned outer flanged wall 1', which wall constitutes the outer rim of a feed trough. Seated within the pan is a pair of rectangular division plates 3, 3', the same being centrally abutted and extending radially to the flanged edge of the pan whereby said pan is divided into four compartments, it being understood that these compartments may be increased or diminished in number as desired. The upper edges of the division plates are provided with horizontally disposed slots 4, which slots are arranged at equal distances from the center of the pan for the reception of the lower edge of an open bottom magazine or hopper 5, the lower edge of the hopper wall being thus supported at a predetermined distance from the bottom of the pan, whereby a feed distributing throat is formed through which the feed is delivered by gravity to the trough. The trough is formed by the outer pan flange 1' and the walls of the hopper, it being understood that said hopper is of lesser diameter than the diameter of the pan. The radial division plates 3, 3', are also apertured at a point intermediate of the pan flange 1 and outer face of the hopper wall adjacent to the upper edge of said plates. These apertures serve as retainers for a wire hooped fender 2, which is threaded through the several division plates and thereafter the ends of said hooped fender are secured by soldering. The edges of the division walls which abut the pan flange 1' are also in solder connection whereby the parts are held rigid. It should be understood however that the means of securing the several parts in their assemblage may be varied without departing from the spirit of my invention and as a substitute for the wire fender shown, a flat ring may be utilized or any other suitable form of fender which will accomplish the desired result.

Attention is called to the fact that the distance between the lower edge of the hopper and pan bottom is predeterminedly arranged to cause sufficient feed to be forced into the trough, there being no opportunity to overflow for the reason that the lower edge of the hopper wall is at all times upon the same approximate horizontal plane as the upper edge of the pan flange.

When it is desired to feed different materials I provide means for dividing the hopper into four compartments, which means comprises a pair of partition plates 6, 6'. The lower edge of the partition plate 6, as best shown in Fig. 1, is provided with a central slot to permit clearance of the division wall 3' which it straddles and from the central point said division plate is provided with a series of vertical slits whereby offset tongues are formed which straddle the division plates 3, 3' that parallel said division wall 6. The outer edges of each of the division walls are fitted snugly against the inner face of the hopper and from the upper edge of the division wall 6 there is extended downward to a predetermined distance a slot 7, which slot forms an interlocked joint with the division plate 6', the same being provided with a similar slot 7' that extends from the bottom edge upward. The lower edge of the division wall 6' is also provided with the offset tongues for engagement with the partition plates 3 and 3' which are alined therewith.

As shown in Fig. 1, the mouth of the hopper is provided with a slip-cover 5' and may also have connected thereto a suitable bail, not shown, whereby the device can be suspended and when so suspended it is understood that the hopper 5 is secured to the division plates 3 and 3' in any suitable manner so as to prevent the pan from disengagement therefrom.

From the foregoing description it is apparent that the trough is divided into sectional compartments by the division plates and that the fender being positioned parallel with the pan flange and outer wall of the hopper will so divide the mouth of the trough as to prevent the poultry from scattering the feed by billing in a radial direction, while the division walls will prevent scattering longitudinally of the trough. This feature in practice is quite essential to the economical feeding of poultry due to the fact that after they have obtained the desired amount of food their habits are such as to cause them to dip into the trough and scatter the remaining food in all directions. It is also apparent that the fender hoop may be suspended either from the outer wall of the hopper or from the upper edge of the pan flange without departing from the spirit of my invention.

I claim:

1. A poultry feeder comprising a pan, rectangular division plates detachably fitted into the pan body, whereby the same is divided into sections, a wire hoop for securing the division plates permanently together, the hoop being juxtaposed to the edge of the pan, a detachable hopper fitted to the rectangular division plates, and division walls carried by the hopper in slip joint union with the aforesaid division plates.

2. A poultry feeder comprising a circular pan having an upturned flanged outer edge, a pair of rectangular division plates fitted within the pan, whereby the latter is divided into compartments, the plates being provided with apertures, a wire hoop fitted within the division plate apertures, means for securing the wire hoop and plates together, whereby the same form a unitary device, and an open bottom circular hopper in slip joint union with the aforesaid division plates, the hopper being of less diameter than the wire hoop, whereby the latter forms a fender.

3. A poultry feeder comprising a circular pan having an upturned flanged outer edge, slotted and apertured division plates detachably fitted within the pan to form separate compartments, an open bottom hopper having its lower edge in slip joint union with the division plate slots, a wire fender seated within the division plate apertures, the same being disposed between the flanged edge of the pan and outer wall of the hopper to form a fender, and means for securing the wire hoop to the several division plates, whereby they are united.

In testimony that I claim the foregoing I have hereunto set my hand at Milwaukee in the county of Milwaukee and State of Wisconsin in the presence of two witnesses.

HERMAN F. LEICHTFUSS.

Witnesses:
 M. E. DOWNEY,
 GEO. W. YOUNG.